United States Patent
Nagasaka et al.

(10) Patent No.: US 10,631,355 B2
(45) Date of Patent: *Apr. 21, 2020

(54) USER TERMINAL, COMMUNICATION CONTROL METHOD, AND BASE STATION

(71) Applicant: KYOCERA Corporation, Kyoto (JP)

(72) Inventors: Yushi Nagasaka, Yokohama (JP); Noriyoshi Fukuta, Inagi (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,104

(22) Filed: Mar. 4, 2019

(65) Prior Publication Data

US 2019/0208560 A1 Jul. 4, 2019

Related U.S. Application Data

(63) Continuation of application No. 15/127,150, filed as application No. PCT/JP2015/058591 on Mar. 20, 2015, now Pat. No. 10,257,875.

(Continued)

(51) Int. Cl.
*H04W 74/08* (2009.01)
*H04W 76/15* (2018.01)
(Continued)

(52) U.S. Cl.
CPC .......... *H04W 76/15* (2018.02); *H04W 28/08* (2013.01); *H04W 74/08* (2013.01);
(Continued)

(58) Field of Classification Search
CPC . H04W 76/15; H04W 76/27; H04W 74/0833; H04W 28/08; H04W 74/08; H04W 88/02; H04W 88/08

See application file for complete search history.

(56) References Cited

U.S. PATENT DOCUMENTS 9,713,044 B2  7/2017 Yamada
9,924,451 B2  3/2018 Natarahjan et al.
(Continued)

FOREIGN PATENT DOCUMENTS

WO    2014/107086 A1    7/2014

OTHER PUBLICATIONS

Intel Corporation; "Further discussion and comparison between CP architecture options C1 and C2"; 3GPP TSG-RAN2 Meeting #83; R2-132820; Aug. 19-23, 2013; total 6 pages; Barcelona, Spain.

(Continued)

*Primary Examiner* — Jay P Patel
(74) *Attorney, Agent, or Firm* — Studebaker & Brackett PC

(57) ABSTRACT

A communication control method and secondary base station perform a dual connectivity scheme in which a master base station and a secondary base station are used, the master base station establishing an RRC connection with a user terminal, and the secondary base station providing additional radio resources to the user terminal. The method includes the secondary base station receiving predetermined information from the master base station, the secondary base station determining, based on the predetermined information, whether or not the random access procedure is required between the user terminal and the secondary base station, and the secondary base station transmitting to the user terminal, based on a result of the determination, a message for triggering the user terminal to initiate the random access procedure.

2 Claims, 9 Drawing Sheets

Related U.S. Application Data

(60) Provisional application No. 61/955,983, filed on Mar. 20, 2014.

(51) Int. Cl.
  *H04W 28/08* (2009.01)
  *H04W 76/27* (2018.01)
  *H04W 88/02* (2009.01)
  *H04W 88/08* (2009.01)

(52) U.S. Cl.
  CPC ....... *H04W 74/0833* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 9,924,521 | B2 | 3/2018 | Heo et al. |
| 2013/0279412 | A1 | 10/2013 | Webb et al. |
| 2014/0022972 | A1* | 1/2014 | Ahn .................. H04W 36/0072 370/311 |
| 2015/0117183 | A1 | 4/2015 | Heo et al. |
| 2015/0208366 | A1* | 7/2015 | Papasakellariou ......................... H04W 74/0833 370/311 |
| 2015/0215826 | A1 | 7/2015 | Yamada |
| 2015/0215965 | A1 | 7/2015 | Yamada |
| 2015/0215967 | A1 | 7/2015 | Plan |
| 2015/0265562 | A1* | 9/2015 | Naccari ................ A61K 31/196 514/567 |
| 2015/0312943 | A1 | 10/2015 | Zhang et al. |
| 2015/0319800 | A1 | 11/2015 | Park et al. |
| 2016/0073431 | A1 | 3/2016 | Park et al. |
| 2016/0212770 | A1 | 7/2016 | Lee et al. |
| 2016/0285716 | A1 | 9/2016 | Pelletier et al. |
| 2016/0295613 | A1 | 10/2016 | Wager |
| 2016/0337848 | A1 | 11/2016 | Chang et al. |
| 2016/0373987 | A1 | 12/2016 | Ahmad et al. |
| 2017/0034866 | A1 | 2/2017 | Wager et al. |
| 2017/0111837 | A1 | 4/2017 | Ahn et al. |
| 2017/0230914 | A1* | 8/2017 | Papasakellariou ......................... H04W 74/0833 |
| 2017/0273095 | A1 | 9/2017 | Heo et al. |
| 2017/0311212 | A1 | 10/2017 | Yamada |

OTHER PUBLICATIONS

ETRI; "Random Access Procedure for Small Cell Enhancements"; 3GPP TSG-RAN WG2 #83bis; R2-133359; Oct. 7-11, 2013; total 3 pages; Ljubljana, Slovenia.

International Search Report issued in PCT/JP2015/058591; dated Jun. 16, 2015.

Written Opinion issued in PCT/JP2015/058591; dated Jun. 16, 2015.

3rd Generation Partnership Project; Technical Specification Group Radio Access Network; Study on Small Cell enhancements for E-UTRA and E-UTRAN; Higher layer aspects; 3GPP TR 36.842 V12.0.0; Dec. 2013; pp. 1-71; Release 12; 3GPP Organizational Partners.

Samsung; Triggering Random Access towards SeNB; 33GPP TSG-RAN WG2 Meeting #85; R2-140246; Feb. 10-14, 2014; pp. 1-5; Prague, Czech Republic.

CATT; Transmission of SeNB configuration; 3GPP TSG RAN WG2 Meeting #84; R2-134056; Nov. 11-15, 2013; pp. 1-5; San Francisco, USA.

Intel Corporation; Radio link failure handling for dual connectivity; 3GPP TSG RAN WG2 Meeting #85; R2-140828; Feb. 10-14, 2014; pp. 1-4; Prague, Czech Republic.

Ericsson; Overall procedures for offloading over Xn; 3GPP TSG-RAN WG2 Meeting #83bis; R2-133419; Oct. 7-11, 2013; pp. 1-9; Ljubljana, Slovenia.

Huawei, HiSilicon; RACH issues on SCell; 3GPP TSG-RAN WG2 Meeting #85; R2-140075; Feb. 10-14, 2014; pp. 1-2; Prague, Czech Republic.

NEC; "Discussion on parallel PRACH preamble transmissions for dual-connectivity"; 3GPP TSG RAN WG1 Meeting #76; R1-140479; Feb. 10-14, 2014; 6pp.; Prague, Czech Republic.

Media Tek Inc.; "Supporting Parallel RA procedure for Dual Connectivity"; 3GPP TSG-RAN2 #84 Meeting; R2-134094; Nov. 11-15, 2013; 4pp.; San Francisco, USA.

Huawei, Hisilicon; "The need of random access in SCG (re-)/configuration procedure"; 3GPP TSG-RAN WG2 Meeting #85; R2-140074; Feb. 10-14, 2014; 4pp.; Prague, Czech Republic.

LG Electronics Inc.; Issues on RA procedure for dual connectivity; 3GPP TSG-RAN2 Meeting #83bis; R2-133540; Oct. 7-11, 2013, 3pp.; Ljubljana, Slovenia.

The extended European search report issued by the European Patent Office dated Oct. 5, 2017, which corresponds to European Patent Application No. 15764848.6-1857 and is related to U.S. Appl. No. 15/127,150.

Samsung; "Parallel random access preamble transmissions in dual connectivity"; 3GPP TSG RAN WG1 Meeting #76; R1-140373; Feb. 10-14, 2014, 3pp.; Prague, Czech Republic.

Samsung; "Overview of small cell on/off scenarios and procedures"; 3GPP TSG-RAN WG1 #76; R1-140367; Feb. 10-14, 2014; 12 pp; Prague, Czech Republic.

Fujitsu; "PDCP status report in dual connectivity"; 3GPP TSG-RAN WG2 Meeting #85b; R2-141246; Mar. 31-Apr. 4, 2014; 5 pp; Valencia, Spain.

\* cited by examiner

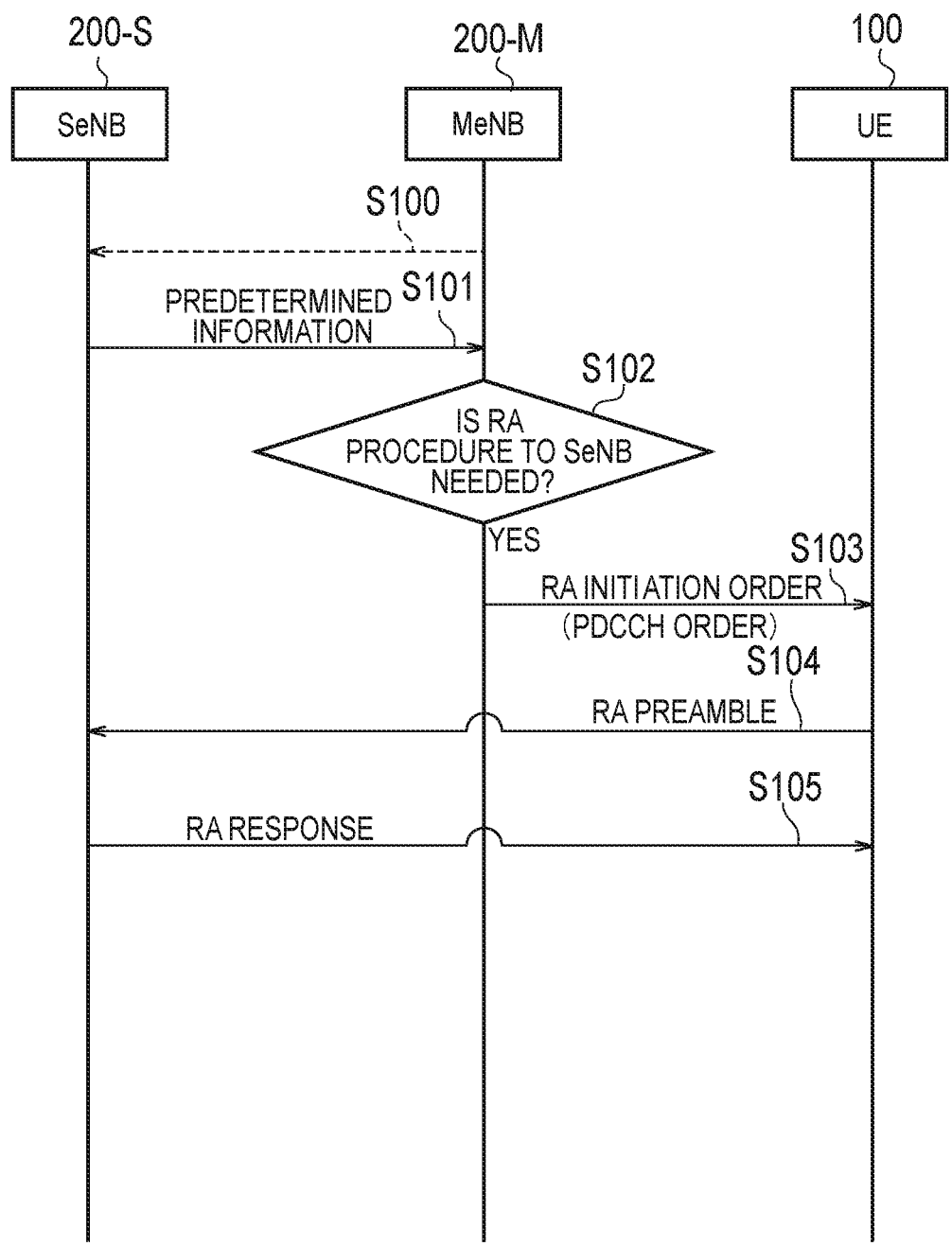

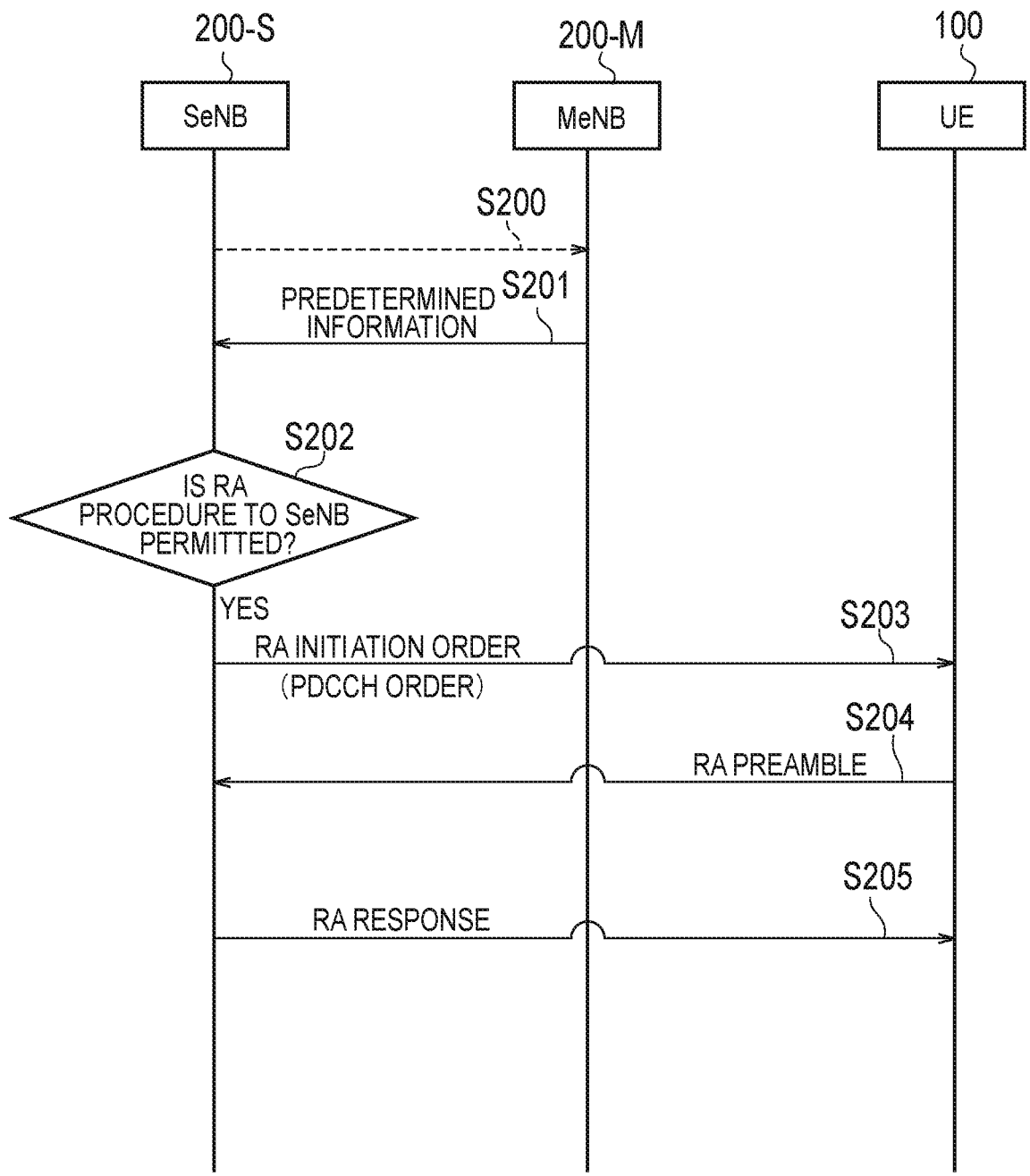

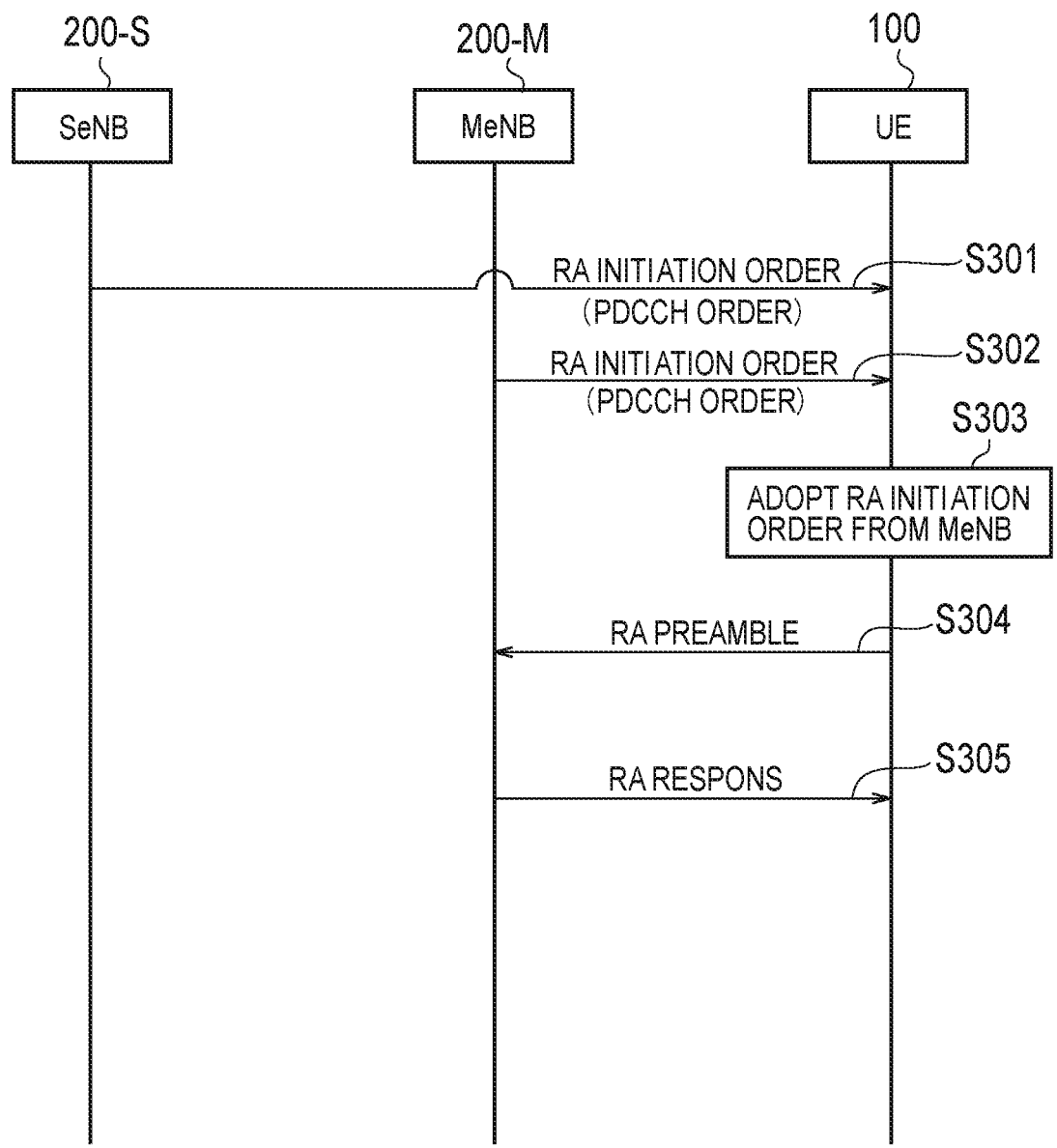

USER TERMINAL, COMMUNICATION CONTROL METHOD, AND BASE STATION

CROSS REFERENCE TO RELATED APPLICATIONS

This application is a Continuation Application of U.S. patent application Ser. No. 15/127,150, filed Sep. 19, 2016, which is the U.S. National Phase Application of International Application No. PCT/JP2015/058591, filed Mar. 20, 2015, which claims benefit of U.S. Provisional Application No. 61/955,983, filed Mar. 20, 2014, the entire contents of which are incorporated herein by reference.

TECHNICAL FIELD

The present disclosure relates to a user terminal, a communication control method, and a base station, used in a mobile communication system.

BACKGROUND ART

In 3GPP (3rd Generation Partnership Project), which is a project aiming to standardize a mobile communication system, introduction of a dual connectivity scheme (Dual connectivity) in Release 12 and thereafter is planned (see Non Patent Document 1). In the dual connectivity scheme, a user terminal simultaneously establishes connections with a plurality of base stations. To the user terminal, a radio resource is assigned from each base station, and thus, it is possible to expect an improvement in throughput.

In the dual connectivity scheme, of a plurality of base stations that establish a connection with a user terminal, one base station (hereinafter, referred to as "master base station") only establishes an RRC connection with the user terminal. On the other hand, of the plurality of base stations, another base station (hereinafter, called "secondary base station") provides an additional radio resource to the user terminal without establishing an RRC connection with the user terminal. It is noted that the dual connectivity scheme may also be called an inter-base station carrier aggregation (inter-eNB CA).

PRIOR ART DOCUMENT

Non-Patent Document

Non Patent Document 1: 3GPP technical report "TR 36.842 V12.0.0" Jan. 7, 2014

SUMMARY

Thus, an aspect of the present application is to provide a communication control method and a secondary base station with which it is possible to appropriately control a random access procedure in the dual connectivity scheme.

A communication control method for controlling communication for performing a dual connectivity scheme in which a master base station and a secondary base station are used, the master base station establishing an RRC connection with a user terminal, and the secondary base station providing additional radio resources to the user terminal, comprises receiving predetermined information from the master base station, by the secondary base station, determining, based on the predetermined information, by the secondary base station, whether or not the random access procedure is required between the user terminal and the secondary base station, and transmitting to the user terminal, by the secondary base station based on a result of the determination, a message for triggering the user terminal to initiate the random access procedure.

A secondary base station is configured to provide additional radio resources to a user terminal in a dual connectivity scheme. The secondary base station comprises a receiver configured to receive predetermined information from a master base station having an RRC connection with the user terminal in the dual connectivity scheme, a controller configured to determine, based on the predetermined information, whether or not the random access procedure is required between the user terminal and the secondary base station, and a transmitter configured to transmit to the user terminal a message for triggering the user terminal to initiate the random access procedure based on a result of the determination.

BRIEF DESCRIPTION OF THE DRAWINGS

FIG. 7A shows a data path configuration and FIG. 7B shows a protocol stack configuration.

FIG. 8A shows a data path configuration and FIG. 8B shows a protocol stack configuration.

FIG. 9 is a diagram showing a communication control method according to the first embodiment.

FIG. 10 is a diagram showing a communication control method according to the second embodiment.

FIG. 11 is a diagram showing a communication control method according to the third embodiment.

DESCRIPTION OF THE EMBODIMENT

[Overview of Embodiment]

Figure 1:
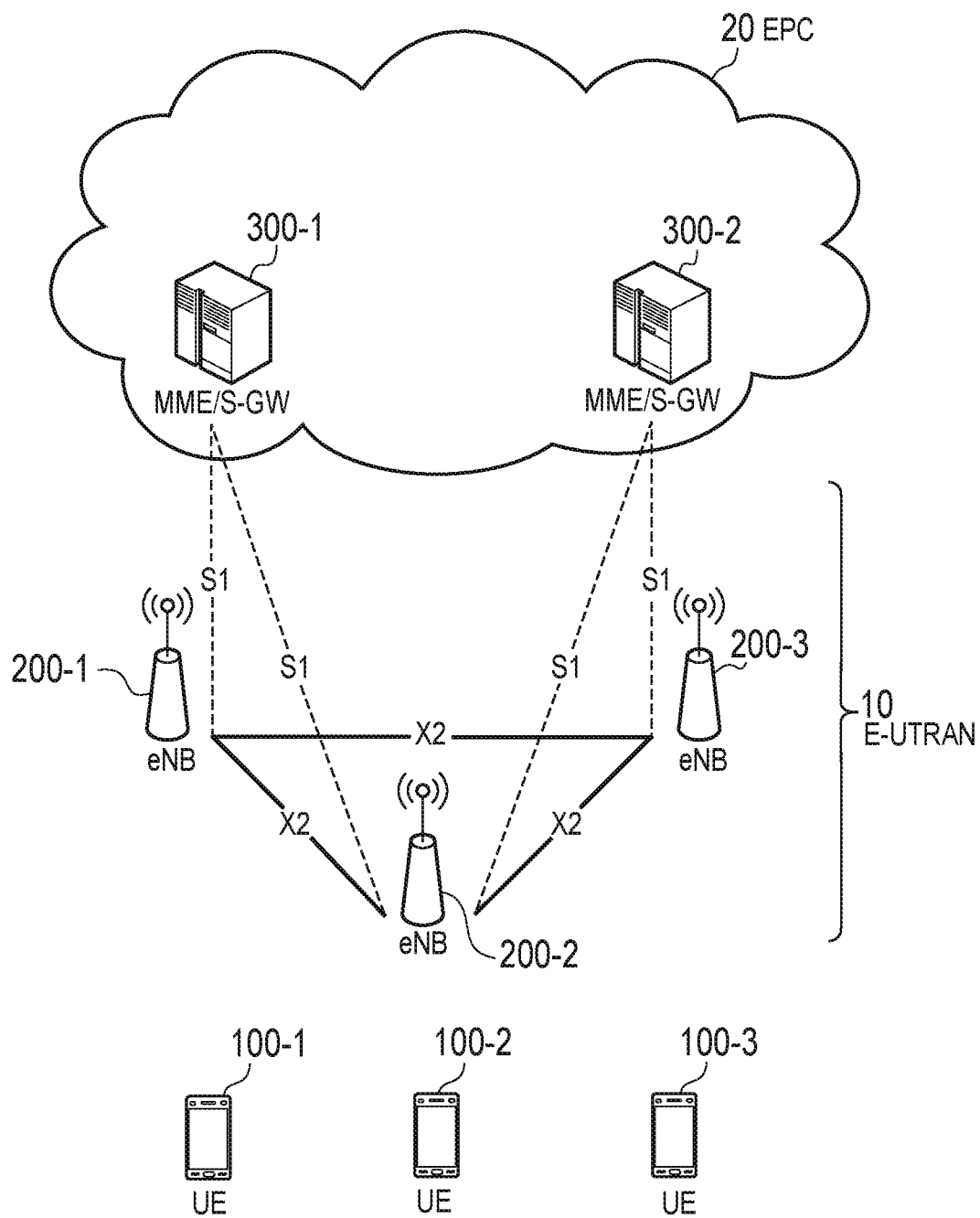
FIG. 1 is a configuration diagram of an LTE system according to a first embodiment to a third embodiment.

A user terminal according to another embodiment (additional statement) is a user terminal in a mobile communication system. The user terminal comprises a controller configured to control communication of a dual connectivity scheme in which a master base station and a secondary base station are used, the master base station establishing an RRC connection with the user terminal, and the secondary base station providing additional radio resources to the user terminal. The controller is configured to initiate a first random access procedure between the user terminal and the master base station and a second random access procedure between the user terminal and the secondary base station, respectively.

A user terminal according to the third embodiment is a user terminal in a mobile communication system. The user terminal comprises: a controller configured to control communication of a dual connectivity scheme in which a master base station and a secondary base station are used, the master base station establishing an RRC connection with the user terminal, and the secondary base station providing additional radio resources to the user terminal. The controller is configured to preferentially initiate a first random access procedure out of the first random access procedure between the user terminal and the master base station and a second random access procedure between the user terminal and the secondary base station.

A communication control method according to the third embodiment is a communication control method for controlling communication of a dual connectivity scheme in which a master base station and a secondary base station are used, the master base station establishing an RRC connection with a user terminal, and the secondary base station providing additional radio resources to the user terminal. The communication control method comprises a step A of receiving, by the user terminal, a first initiation order and a second initiation order, the first initiation order ordering an initiation of a first random access procedure between the user terminal and the master base station, and the second initiation order ordering an initiation of a second random access procedure between the user terminal and the secondary base station, and a step B of adopting, by the user terminal, one of the first initiation order and the second initiation order, while ignoring or withholding other of the first initiation order and the second initiation order.

In the third embodiment, in the step B, the user terminal preferentially adopts the first initiation order over the second initiation order.

In the third embodiment, in the step B, the user terminal adopts the first initiation order while ignoring or withholding the second initiation order.

In the third embodiment, in a case where the user terminal withholds the second initiation order, the user terminal initiates the second random access procedure in response to the second initiation order after completing the first random access procedure in response to the first initiation order.

A communication control method according to the first embodiment is a communication control method for controlling communication of a dual connectivity scheme in which a master base station and a secondary base station are used, the master base station establishing an RRC connection with a user terminal, and the secondary base station providing additional radio resources to the user terminal. The communication control method comprises: a step A of determining, by the master base station, whether or not a random access procedure is needed between the user terminal and the secondary base station; and a step B of transmitting, from the master base station to the user terminal, an initiation order ordering an initiation of the random access procedure based on a result of determination in the step A. In the step A, the master base station performs the determination based on predetermined information received from the secondary base station.

In operation pattern 1 of the first embodiment, the predetermined information is communication status information relating a communication status between the user terminal and the secondary base station.

In operation pattern 1 of the first embodiment, it further comprises: a step of transmitting, from the master base station to the secondary base station, a transmission request for the communication status information; and a step of transmitting, from the secondary base station to the master base station, the communication status information in response to a reception of the transmission request.

In operation pattern 2 of the first embodiment, the predetermined information is request information indicating that the secondary base station requests a transmission of the initiation order.

In operation pattern 2 of the first embodiment, it further comprises a step of transmitting, from the secondary base station to the master base station, the request information based on a communication status between the user terminal and the secondary base station.

A communication control method according to the second embodiment is a communication control method for controlling communication of a dual connectivity scheme in which a master base station and a secondary base station are used, the master base station establishing an RRC connection with a user terminal, and the secondary base station providing additional radio resources to the user terminal. The communication control method comprises: a step A of determining, by the secondary base station, whether or not a random access procedure between the user terminal and the secondary base station is permitted; and a step B of transmitting, from the secondary base station to the user terminal, an initiation order ordering an initiation of the random access procedure based on a result of determination in the step A. In the step A, the secondary base station performs the determination based on predetermined information received from the master base station.

In operation pattern 1 of the second embodiment, the predetermined information is at least one of regulation information indicating a regulation of the random access procedure and cancellation information indicating a cancellation of the regulation.

In operation pattern 1 of the second embodiment, the communication control method further comprises: a step of transmitting, from the master base station to the secondary base station, the regulation information before initiating a random access procedure between the user terminal and the master base station; and a step of transmitting, from the master base station to the secondary base station, the cancellation information in response to a completion of the random access procedure between the user terminal and the master base station.

In operation pattern 2 of the second embodiment, it further comprises a step of transmitting, from the secondary base station to the master base station, inquiry whether or not an initiation of the random access procedure is permitted. The predetermined information is a response information transmitted from the master base station in response to the inquiry.

In operation pattern 2 of the second embodiment, the communication control method further comprises a step of transmitting, from the secondary base station to the master base station, a completion notification in response to a completion of the random access procedure.

A base station according to the first embodiment is configured to establish an RRC connection with a user terminal in a dual connectivity scheme. The base station comprises: a controller configured to determine whether or not a random access procedure is needed between the user terminal and another base station providing additional radio resources to the user terminal in the dual connectivity scheme; and a transmitter configured to transmit an initiation order to the user terminal based on a result of the determination, the initiation order ordering an initiation of the random access procedure. The controller is configured to perform the determination based on predetermined information which the base station receives from the another base station.

A base station according to the second embodiment is configured to provide additional radio resources to a user terminal in a dual connectivity scheme. The base station comprises: a controller configured to determine whether or not a random access procedure is needed between the user terminal and another base station establishing an RRC connection with the user terminal in the dual connectivity scheme; and a transmitter configured to transmit an initiation order to the user terminal based on a result of the determination, the initiation order ordering an initiation of the random access procedure. The controller is configured to perform the determination based on predetermined information which the base station receives from another base station.

[First Embodiment]

Hereinafter, an embodiment in a case where the present disclosure is applied to an LTE system being a mobile communication system based on 3GPP standard will be described.

(System Configuration)

FIG. 1 is a configuration diagram of an LTE system according to the first embodiment.

As illustrated in FIG. 1, the LTE system according to the first embodiment comprises UEs (User Equipments) 100, E-UTRAN (Evolved-UMTS Universal Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 controls a cell or a plurality of cells, and performs radio communication with the UE 100 that establishes a connection with the cell of the eNB 200. The eNB 200, for example, has a radio resource management (RRM) function, a routing function of user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. The EPC 20 includes MMEs (Mobility Management Entities)/S-GWs (Serving-Gateways) 300. The MME performs various mobility controls, etc., for the UE 100. The S-GW performs transfer control of user data. The MME/S-GW 300 connected to the eNBs 200 cia an S1 interface.

Figure 2:
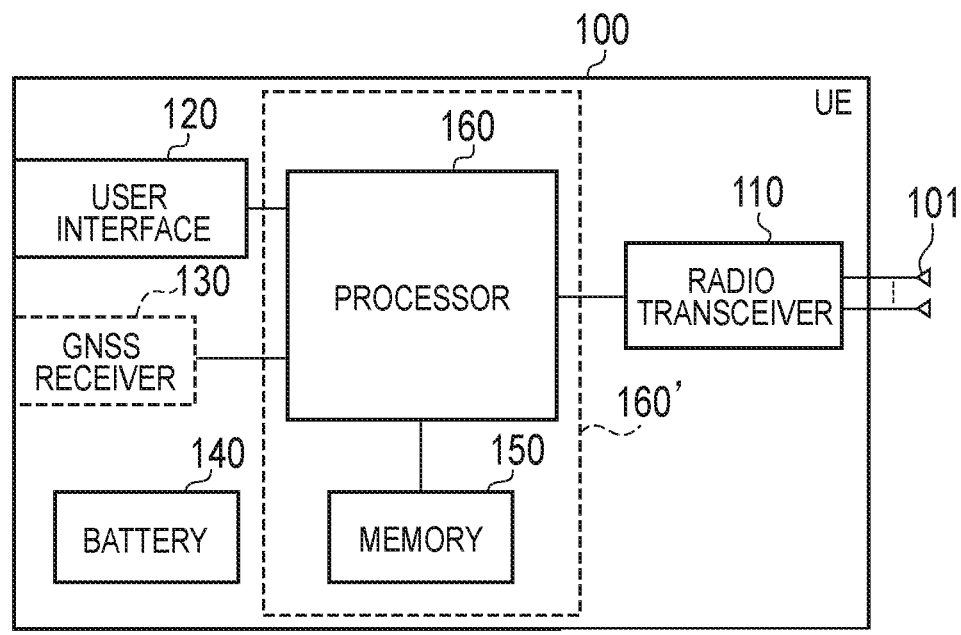
FIG. 2 is a block diagram of UE according to the first embodiment to the third embodiment.

FIG. 2 is a block diagram of the UE 100. As illustrated in FIG. 2, the UE 100 comprises a plurality of antennas 101, a radio transceiver 110, a user interface 120, GNSS (Global Navigation Satellite System) receiver 130, a battery 140, a memory 150, and a processor 160. The memory 150 and the processor 160 constitute a control unit. The UE 100 may not have the GNSS receiver 130. The memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (a transmission signal) output from the processor 160 into the radio signal, and transmits the radio signal from the antennas 101. Furthermore, the radio transceiver 110 converts the radio signal received by the antenna 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
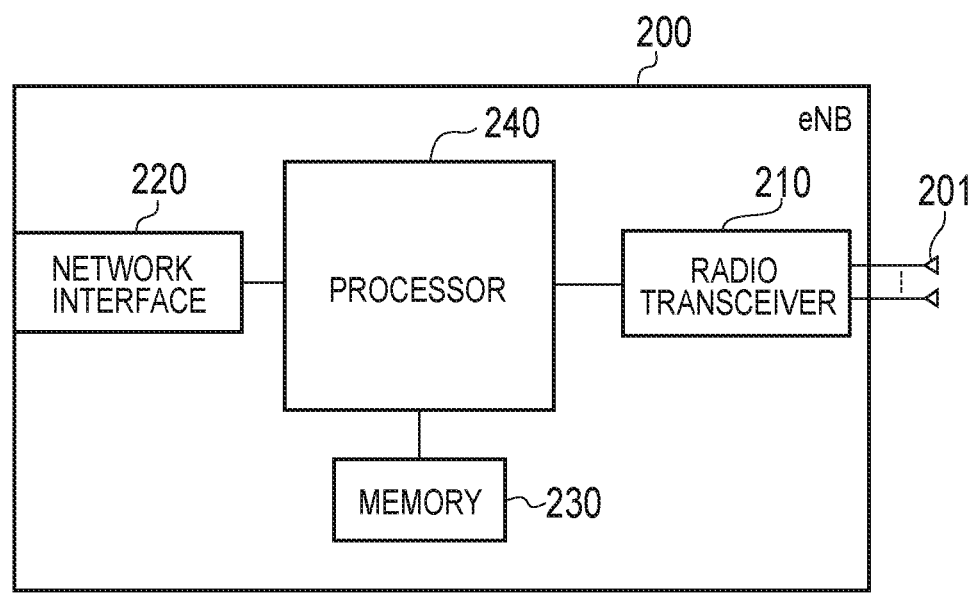
FIG. 3 is a block diagram of eNB according to the first embodiment to the third embodiment.

FIG. 3 is a block diagram of the eNB 200. As illustrated in FIG. 3, the eNB 200 comprises a plurality of antennas 201, a radio transceiver 210, a network interface 220, a memory 230, and a processor 240. The memory 230 and the processor 240 constitute a control unit. The memory 230 may be integrally formed with the processor 240, and this set (that is, a chipset) may be called a processor.

The antennas 201 and the radio transceiver 210 are used to transmit and receive a radio signal. The radio transceiver 210 converts a baseband signal output (a transmission signal) from the processor 240 into the radio signal, and transmits the radio signal from the antenna 201. Furthermore, the radio transceiver 210 converts the radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
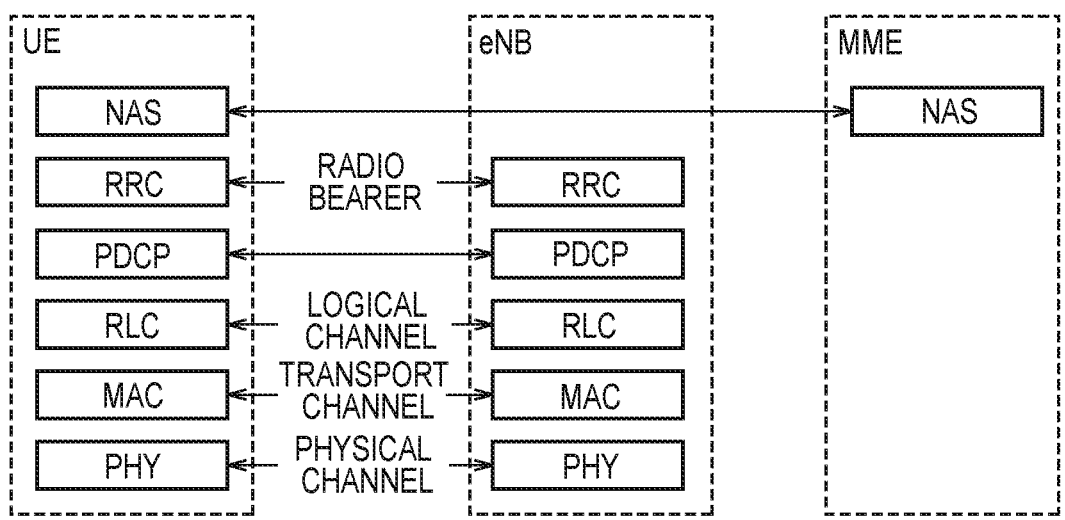
FIG. 4 is a protocol stack diagram of a radio interface according to the first embodiment to the third embodiment.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The physical layer performs encoding and decoding, modulation and demodulation, antenna mapping and demapping, and resource mapping and demapping. The physical layer provides a transmission service to an upper layer by using a physical channel. Between the physical layer of the UE 100 and the physical layer of the eNB 200, user data and control signal are transmitted through the physical channel.

The MAC layer performs priority control of data, a retransmission process and the like by hybrid ARQ (HARQ), and a random access procedure. Between the MAC layer of the UE 100 and the MAC layer of the eNB 200, the user data and the control signal are transmitted via a transport channel. The MAC layer of the eNB 200 includes a transport format of an uplink and a downlink (a transport block size, a modulation and coding scheme) and a MAC scheduler to decide a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling the control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a RRC connected state (a connected mode), and when the RRC connection is not established, the UE 100 is in an RRC idle state (an idle mode).

NAS (Non-Access Stratum) layer positioned above the RRC layer performs session management, mobility management and the like.

Figure 5:
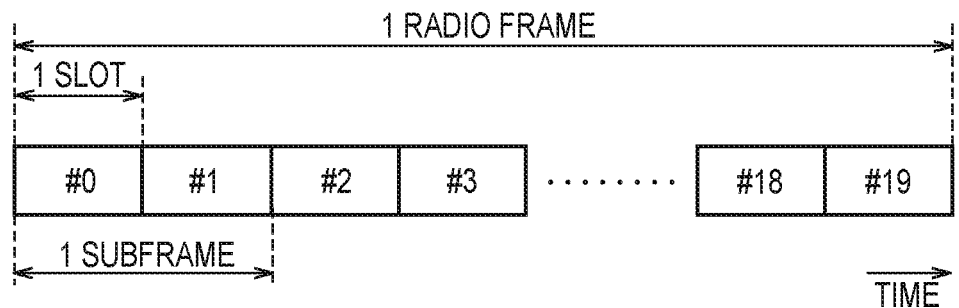
FIG. 5 is a configuration diagram of a radio frame used in an LTE system.

FIG. 5 is a configuration diagram of a radio frame used in the LTE system. In the LTE system, OFDMA (Orthogonal Frequency Division Multiple Access) is applied in a downlink, and SC-FDMA (Single Carrier Frequency Division Multiple Access) is employed in an uplink, respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Among radio resources (time-frequency resources) assigned to the UE 100, a frequency resource can be designated by a resource block and a time resource can be designated by a subframe (or slot).

In the downlink, an interval of several symbols at the head of each subframe is a region mainly used as a physical downlink control channel (PDCCH) for transmitting the control signal. Furthermore, the remaining interval of each subframe is a region that can be mainly used as a physical downlink shared channel (PDSCH) for transmitting the user data.

In the uplink, both ends in the frequency direction of each subframe are regions mainly used as a physical uplink control channel (PUCCH) for transmitting the control signal. The other portion of each subframe is a region that can be mainly used as a physical uplink shared channel (PUSCH) for transmitting the user data. Moreover, in each subframe, a demodulation reference signal (DMRS) and a sounding reference signal (SRS) are arranged. Further, the central six resource blocks in the frequency direction in a predetermined subframe are regions used as a physical random access channel (PRACH) for transmitting a random access preamble.

(Dual Connectivity Scheme)

An LTE system according to the first embodiment supports a dual connectivity scheme. The dual connectivity scheme is introduced in Release 12 or later. In the dual connectivity scheme, a radio resource is assigned to the UE 100 from a plurality of eNBs 200, and thus, it is expected to see an improvement in throughput. It is noted that the dual connectivity scheme may be called a carrier aggregation between eNBs 200 (inter-eNB CA).

Figure 6:
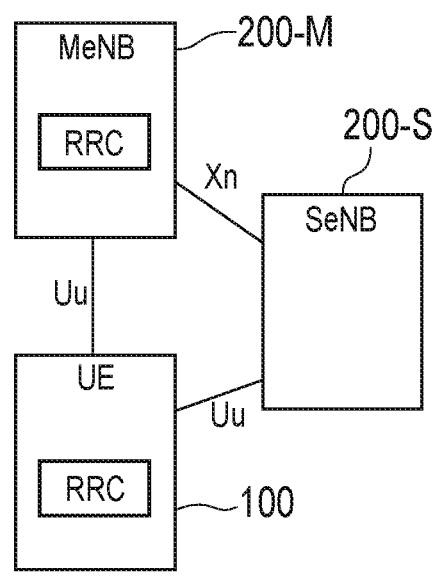
FIG. 6 is a diagram showing an overview of a dual connectivity scheme.

FIG. 6 is a diagram showing an overview of the dual connectivity scheme.

As shown in FIG. 6, in the dual connectivity scheme, only a master eNB (MeNB) 200-M establishes an RRC connection with the UE 100. On the other hand, a secondary eNB (SeNB) 200-S provides an additional radio resource to the UE 100 without establishing an RRC connection with the UE 100. In other words, the MeNB 200-M establishes not only a user plane connection, but also a control plane connection with the UE 100. On the other hand, the SeNB 200-S establishes a user plane connection with the UE 100, without establishing a control plane connection with the UE 100. An Xn interface is set between the MeNB 200-M and the SeNB 200-S. The Xn interface is an X2 interface or a new interface.

In the dual connectivity scheme, the UE 100 is capable of carrier aggregation using N number of cells managed by the MeNB 200-M and M number of cells managed by the SeNB 200-S, simultaneously. In the dual connectivity scheme, the maximum number serving cells of the UE 100, that is, the maximum number of (N+M) is five, for example. Here, the group consisting of N number of cells managed by the MeNB 200-M is called a master cell group (MCG). Moreover, the group consisting of M number of cells managed by the SeNB 200-S is called a secondary cell group (SCG). To the SCG, a special cell (Special Cell) in which the PUCCH of the UE 100 is provided is set. The Special Cell executes some of the functions of a primary cell (PCell) in carrier aggregation.

FIG. 7A to FIG. 8B are diagrams showing a transfer route (data path) of user data in the dual connectivity scheme. There are mainly two types of user plane architectures (UP architectures) configuring the data path.

Figure 7A:
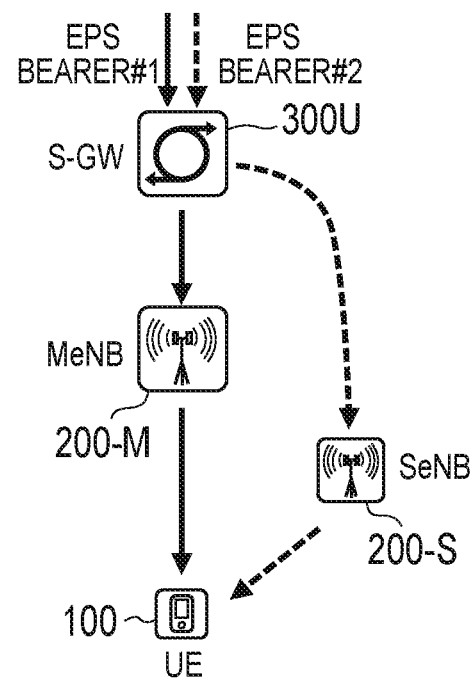
FIGS. 7A and 7B are diagrams showing a first UP architecture (UP architecture "1A"), where
Figure 7B:
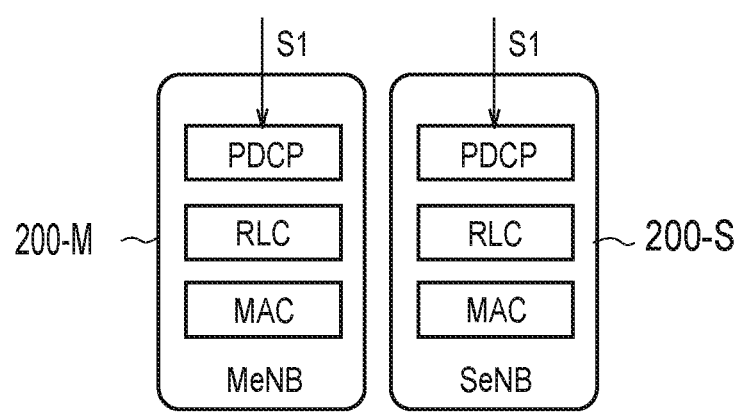

FIGS. 7A and 7B illustrate a first UP architecture. As shown in FIG. 7A, in the first UP architecture, an S1-U interface between the MeNB 200-M and S-GW 300U, and an S1-U interface between the SeNB 200-S and the S-GW 300U are used. An EPS bearer #1 between the UE 100 and P-GW passes through the S1-U interface between the MeNB 200-M and the S-GW 300U. An EPS bearer #2 between the UE 100 and the P-GW passes through the S1-U interface between the SeNB 200-S and the S-GW 300U. Thus, in the first UP architecture, the data path between the SeNB 200-S and S-GW 300U does not pass through the MeNB 200-M. As shown in FIG. 7B, each of the MeNB 200-M and the SeNB 200-S perform the processing of each layer of PDCP, RLC, and MAC.

Figure 8A:
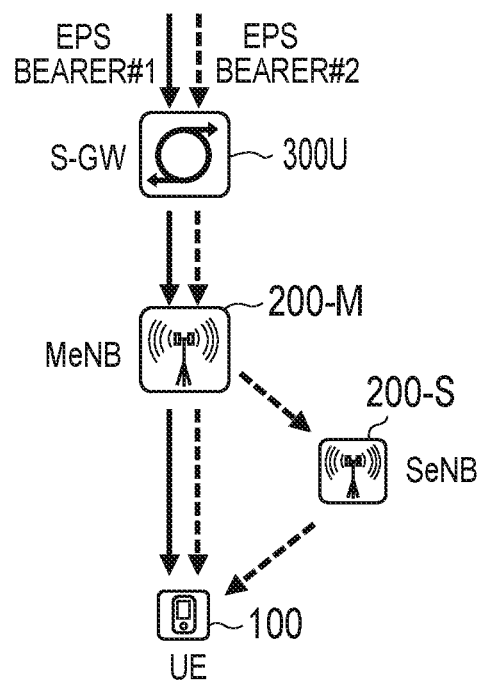
FIGS. 8A and 8B are diagrams showing a second UP architecture (UP architecture "3C"), where
Figure 8B:
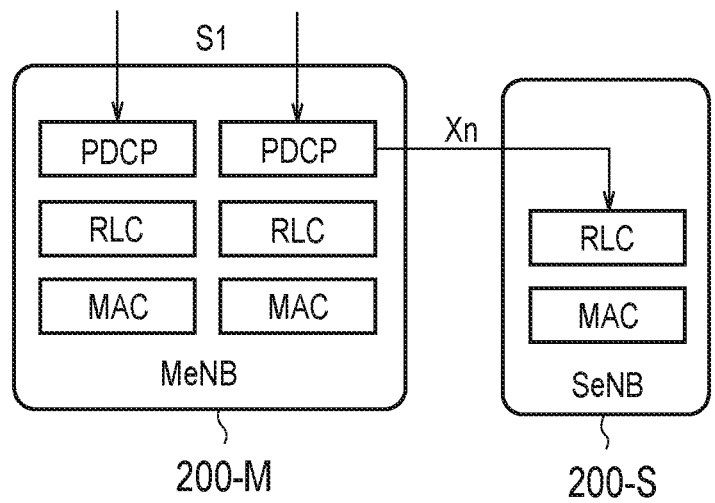

FIGS. 8A and 8B illustrate a second UP architecture. As shown in FIG. 8A, in the second UP architecture, the EPS bearer #2 between the UE 100 and the P-GW is split in the MeNB 200-M, and while one of the split parts (a split bearer) terminates in the UE 100 after passing through the SeNB 200-S, the other split part (a split bearer) terminates in the UE 100 without passing through the SeNB 200-S. Thus, in the second UP architecture, the data path between the SeNB 200-S and S-GW 300U passes through the MeNB 200-M. As shown in FIG. 8B, for one of the split parts (split bearer) of the EPS bearer #2, the processing for each layer is performed by the PDCP of the MeNB 200-M and the RLC and MAC of the SeNB 200-S.

(Communication Control Method According to the First Embodiment)

In the communication between the UE 100 and the eNB 200, a random access procedure is needed for a purpose of adjustment of a transmission timing (Timing Advance) of an uplink, for example. The UE 100 initiates the random access procedure in response to an order (PDCCH ORDER) from the eNB 200.

However, in the dual connectivity scheme, the random access procedure between the UE 100 and the MeNB 200-M may contend with the random access procedure between the UE 100 and the SeNB 200-S. Therefore, resulting from the contention in random access procedure, an error such as a failure of random access procedure may occur.

Hereinafter, the communication control method with which it is possible to avoid a contention in random access procedure in the dual connectivity scheme will be described, below.

The communication control method according to the first embodiment is a method for controlling dual connectivity communication that uses the MeNB 200-M that establishes an RRC connection with the UE 100, and the SeNB 200-S that provides an additional radio resource to the UE 100. The communication control method according to the first embodiment comprises: a step A of determining, by the MeNB 200-M, whether or not a random access procedure is needed between the UE 100 and the SeNB 200-S; and a step B of transmitting, from the MeNB 200-M to the UE 100, an initiation order that orders an initiation of the random access procedure based on a result of determination in the step A. In the step A, the MeNB 200-M performs the determination based on predetermined information received from the SeNB 200-S.

Thus, in the first embodiment, the MeNB 200-M, instead of the SeNB 200-S, causes the UE 100 to initiate the random access procedure to the SeNB 200-S. That is, the authority for causing the UE 100 to initiate the random access procedure in the dual connectivity scheme is owned by the MeNB 200-M, and it is not owned by the SeNB 200-S. As a result, it is possible to avoid a contention in random access procedure. Further, the MeNB 200-M causes the random access procedure to the SeNB 200-S to be initiated on the basis of predetermined information received from the SeNB 200-S, and thus, the MeNB 200-M is capable of appropriately initiating the random access procedure in consideration of a state of the SeNB 200-S.

It is noted that the random access procedure ordered by the MeNB 200-M is a contention-free-based random access procedure (Contention free random access procedure), for example. Further, the MeNB 200-M applies the order (PDCCH ORDER) to the UE 100 from a primary cell included in MCG.

Operation patterns 1 and 2 of the first embodiment will be described, below. FIG. 9 is a diagram showing a communication control method according to the first embodiment. In the initial state of FIG. 9, the UE 100 performs communication of the dual connectivity scheme with the MeNB 200-M and the SeNB 200-S. Further, it is assumed that the communication between the MeNB 200-M and the SeNB 200-S is performed over an Xn interface.

(1) Operation Pattern 1

In the operation pattern 1 of the first embodiment, the predetermined information received by the MeNB 200-M, from the SeNB 200-S is communication state information on a communication state between the UE 100 and the SeNB 200-S. The "communication state" includes a state of adjustment of a transmission timing (Timing Advance) of an uplink and a generation state of downlink data from the SeNB 200-S to the UE 100, for example. When the MeNB 200-M comprehends such a communication state, the MeNB 200-M can cause the UE 100 to appropriately initiate the random access procedure to the SeNB 200-S. It is noted that the "communication state" basically needs to take into consideration each cell configuring the SCG. Thus, it is preferable that the communication state information includes information on a communication state of each cell configuring the SCG. However, when each cell configuring the SCG belongs to the same TAG (timing advance group), the "communication state" may take into consideration the Special Cell only. In this case, the communication state information may only need to include the communication state information on the Special Cell.

As illustrated in FIG. 9, in step S100, the MeNB 200-M transmits a transmission request for the communication state information, to the SeNB 200-S.

In step S101, the SeNB 200-S having received the transmission request transmits to the MeNB 200-M the communication state information as the predetermined information, in receipt of the transmission request. However, the SeNB 200-S may autonomously transmit the communication state information to the MeNB 200-M in a predetermined cycle.

In step S102, the MeNB 200-M having received the communication state information determines on the basis of the communication state information whether or not the random access procedure (hereinafter, referred to as "RA procedure") between the UE 100 and the SeNB 200-S is needed. When a Timing Advance process on the UE 100 is needed, the MeNB 200-M determines that the RA procedure is needed. Alternatively, when the downlink data from the SeNB 200-S to the UE 100 is generated, the MeNB 200-M determines that the RA procedure is needed. The determination in step S102 is performed for each cell configuring the SCG or performed only for the Special Cell. It is noted that upon determination that the RA procedure is not needed, the MeNB 200-M returns the process to step S100 or S101.

Upon determination that the RA procedure is needed, in step S103, the MeNB 200-M transmits an initiation order (PDCCH ORDER) of the RA procedure, to the UE 100. Here, the contention-free-based random access procedure is assumed, and thus, the MeNB 200-M previously acquires the information on a contention-free-based random access preamble retained by the SeNB 200-S, and from these, designates the random access preamble to the UE 100.

In step S104, the UE 100 having received the initiation order of the RA procedure transmits a random access preamble (hereinafter, referred to as "RA preamble") over the RACH (Random Access Channel), to the SeNB 200-S. When receiving the PDCCH order to the Special Cell, the UE 100 transmits the RA preamble to the Special Cell, and when receiving the PDCCH order to another cell of the SCG, the UE 100 transmits the RA preamble to the other cell.

In step S105, the SeNB 200-S having received the RA preamble estimates delay in uplink with the UE 100, in response to the RA preamble. Then, the SeNB 200-S transmits a random access response (hereinafter, referred to as "RA response") to the UE 100. The RA response includes an adjustment value of a transmission timing of an uplink (Timing Advance value) and information on an assigned radio resource (UL Grant), for example. It is noted that the contention-free-based RA procedure is completed in step S105; however, when the contention-based RA procedure is concerned, the RRC message is exchanged between the UE 100 and the SeNB 200-S after step S105 and then the RA procedure is completed.

(2) Operation Pattern 2

In the operation pattern 2 of the first embodiment, the predetermined information received by the MeNB 200-M, from the SeNB 200-S is RA request information indicating that the transmission of the initiation order of the RA procedure is requested by the SeNB 200-S. Thus, the MeNB 200-M can directly comprehend the necessity for the RA procedure on the SeNB 200-S.

As illustrated in FIG. 9, in the operation pattern 2, step S100 is not needed.

In step S101, the SeNB 200-S transmits, to the SeNB 200-S, the RA request information as the predetermined information, on the basis of the communication state between the UE 100 and the SeNB 200-S. The RA request information may include information indicating a cell of initiation target of the RA procedure.

In step S102, the MeNB 200-M having received the RA request information determines on the basis of the RA request information that the RA procedure between the UE 100 and the SeNB 200-S is needed.

Upon determination that the RA procedure is needed, in step S103, the MeNB 200-M transmits an initiation order (PDCCH ORDER) of the RA procedure, to the UE 100. The subsequent operations are the same as those in the above operation pattern 1.

[Second Embodiment]

Hereinafter, the second embodiment will be described while focusing on differences from the first embodiment. In the second embodiment, the system configuration and the dual connectivity scheme are the same as those in the first embodiment.

The communication control method according to the second embodiment is a method for controlling communication of a dual connectivity scheme using the MeNB 200-M establishing an RRC connection with the UE 100, and the SeNB 200-S providing an additional radio resource to the UE 100. The communication control method according to the second embodiment comprises: a step A of determining, by the SeNB 200-S, whether or not an initiation of an RA procedure between the UE 100 and the SeNB 200-S is permitted; and a step B of transmitting, from the SeNB 200-S to the UE 100, an initiation order that orders an initiation of the random access procedure based on a result of determination in the step A. In the step A, the SeNB 200-S performs the determination based on predetermined information received from the MeNB 200-M.

Thus, in the second embodiment, the SeNB 200-S itself causes the UE 100 to initiate the RA procedure on the SeNB 200-S. However, the SeNB 200-S determines on the basis of the predetermined information received from the MeNB 200-M whether or not the initiation of the RA procedure on the SeNB 200-S is permitted. As a result, the SeNB 200-S can appropriately cause an initiation of the RA procedure while avoiding the contention of the RA procedure with the MeNB 200-M.

It is noted that the random access procedure ordered by the SeNB 200-S is a contention-free-based random access procedure (Contention free random access procedure), for example. Further, the SeNB 200-S applies the order (PDCCH ORDER) to the UE 100 from the Special Cell included in the SCG.

Operation patterns 1 and 2 of the second embodiment will be described, below. FIG. 10 is a diagram showing a communication control method according to the second embodiment. In the initial state of FIG. 10, the UE 100 performs the communication of the dual connectivity scheme with the MeNB 200-M and the SeNB 200-S. Further, it is assumed that the communication between the MeNB 200-M and the SeNB 200-S is performed over an Xn interface.

(1) Operation Pattern 1

In the operation pattern 1 of the second embodiment, the predetermined information received by the SeNB 200-S from the MeNB 200-M is at least one of regulation information indicating regulation of the RA procedure and cancellation information indicating a cancellation of the regulation. For example, in the operation pattern 1, before initiating the RA procedure between the UE 100 and the MeNB 200-M, the MeNB 200-M transmits the regulation information to the SeNB 200-S. Then, in response to the completion of the RA procedure between the UE 100 and the MeNB 200-M, the MeNB 200-M transmits the cancellation information to the SeNB 200-S.

As illustrated in FIG. 10, in the operation pattern 1, step S200 is not needed.

In step S201, the MeNB 200-M transmits, to the SeNB 200-S, at least one of the regulation information indicating the regulation of the RA procedure and the cancellation information indicating the cancellation of the regulation.

In step S202, the SeNB 200-S determines on the basis of the information received from the MeNB 200-M whether or not the RA procedure is permitted. The SeNB 200-S determines that the RA procedure is not permitted (prohibited) when receiving the regulation information from the MeNB 200-M. That is, while the RA procedure to the MeNB 200-M is performed, it is ensured that the RA procedure on the SeNB 200-S is not initiated. On the other hand, the SeNB 200-S determines that the RA procedure is permitted when receiving the cancellation information from the MeNB 200-M. It is noted that upon determination that the RA procedure is not permitted, the SeNB 200-S returns the process to step S201.

Upon determination that the RA procedure is permitted, in step S203, the SeNB 200-S transmits an initiation order (PDCCH ORDER) of the RA procedure, to the UE 100. In this case, the contention-free-based RA procedure is assumed, and thus, the SeNB 200-S designates the RA preamble to the UE 100 from among the contention-free-based RA preambles retained by the SeNB 200-S.

In step S204, the UE 100 having received the initiation order of the RA procedure transmits, over the RACH, the RA preamble to the SeNB 200-S.

In step S205, the SeNB 200-S having received the RA preamble estimates delay in uplink with the UE 100, in response to the RA preamble. Then, the SeNB 200-S transmits the RA response to the UE 100. The RA response includes an adjustment value of a transmission timing of an uplink (Timing Advance value) and information on an assigned radio resource (UL Grant), for example. It is noted that the contention-free-based RA procedure is completed in step S205; however, when a contention-based RA procedure is concerned, the RRC message is exchanged between the UE 100 and the SeNB 200-S after step S205 and then the RA procedure is completed.

(2) Operation Pattern 2

In the operation pattern 2 of the second embodiment, the SeNB 200-S transmits an inquiry as to whether or not the initiation of the RA procedure is permitted, to the MeNB 200-M. The predetermined information received by the SeNB 200-S from the MeNB 200-M is response information transmitted from the MeNB 200-M in response to the inquiry.

As illustrated in FIG. 10, in the operation pattern 2, in step S200, the SeNB 200-S transmits the inquiry as to whether or not the initiation of the RA procedure is permitted, to the MeNB 200-M. For example, the SeNB 200-S transmits the inquiry to the MeNB 200-M upon determination that there arises a need of initiating the RA procedure.

In step S201, the MeNB 200-M having received the inquiry transmits the response information to the inquiry, to the SeNB 200-S. The response information is a negative acknowledgment (NACK) to the inquiry or an acknowledgment (ACK) to the inquiry. The negative acknowledgment (NACK) may include information indicating a reason for the negative acknowledgment. For example, the MeNB 200-M returns the negative acknowledgment (NACK) when the RA procedure on the MeNB 200-M is being executed or attempted to be executed.

In step S202, the SeNB 200-S determines on the basis of the response information received from the MeNB 200-M whether or not the initiation of the RA procedure is permitted. The SeNB 200-S determines that the initiation of the RA procedure is permitted when receiving an acknowledgment (ACK) from the MeNB 200-M. On the other hand, the SeNB 200-S determines that the initiation of the RA procedure is not permitted (prohibited) when receiving a negative acknowledgment (NACK) from the MeNB 200-M. It is noted that upon determination that the RA procedure is not permitted, the SeNB 200-S returns the process to step S200.

Upon determination that the RA procedure is permitted, in step S203, the SeNB 200-S transmits an initiation order (PDCCH ORDER) of the RA procedure, to the UE 100. The subsequent operations are the same as those in the above operation pattern 1.

It is noted that in the operation pattern 2, the SeNB 200-S transmits an RA completion notification to the MeNB 200-M in response to the completion of the RA procedure. Thus, the MeNB 200-M can comprehend the completion of the RA procedure in the SeNB 200-S.

[Third Embodiment]

Hereinafter, a third embodiment will be described while focusing on the differences from the first and the second embodiments. The system configuration and the dual connectivity scheme are the same as those in the first embodiment.

The communication control method according to the third embodiment is a method for controlling communication of the dual connectivity scheme using the MeNB 200-M establishing an RRC connection with the UE 100, and the SeNB 200-S providing an additional radio resource to the UE 100. The communication control method according to the third embodiment comprising: a step A of receiving, by the UE 100, a first initiation order that orders an initiation of a first RA procedure between the UE 100 and the MeNB 200-M and a second initiation order that orders an initiation of a second RA procedure between the UE 100 and the SeNB 200-S; and a step B of adopting, by the UE 100, one of the first initiation order and the second initiation order, and ignoring or withholding the other of the orders.

Thus, in the third embodiment, the contention of the RA procedure is avoided at the UE 100 side. That is, even when the UE 100 is ordered to initiate the RA procedure from both the MeNB 200-M and the SeNB 200-S, the UE 100 performs one RA procedure and does not perform (or withholds) the other RA procedure. As a result, it is possible to appropriately initiate the RA procedure while avoiding the contention of the RA procedure.

In the third embodiment, in step B, it is preferred that the UE 100 adopts the first initiation order and ignores or withholds the second initiation order. In other words, the priority is previously assigned so that the RA procedure of the MeNB 200-M is prioritized. As described above, the MeNB 200-M has the RRC connection with the UE 100, and when the RRC connection is disconnected, it is not possible to control the communication with the SeNB 200-S. Therefore, the RA procedure of the MeNB 200-M should be prioritized.

In a case where the second initiation order is withheld, the UE 100 completes the first RA procedure in response to the first initiation order, and thereafter, initiates the second RA procedure in response to the second initiation order. As a result, it is possible to perform the RA procedure with the SeNB 200-S after the completion of the RA procedure with the MeNB 200-M, and thus, it is possible to make a good communication state with the SeNB 200-S.

FIG. 11 is a diagram showing an operation of the third embodiment. In the initial state of FIG. 11, the UE 100 performs dual connectivity communication with the MeNB 200-M and the SeNB 200-S. In this case, a case is assumed where before the UE 100 initiates the second RA procedure in response to the second initiation order from the SeNB 200-S, the UE 100 receives the first initiation order from the MeNB 200-M. However, a case may be assumed where the first initiation order and the second initiation order are simultaneously received.

As illustrated in FIG. 11, in step S301, the SeNB 200-S transmits the initiation order of the RA procedure (second initiation order), to the UE 100. In this case, the contention-free-based RA procedure is assumed, and thus, the SeNB 200-S designates the RA preamble to the UE 100 from among the contention-free-based RA preambles retained by the SeNB 200-S.

In step S302, the MeNB 200-M transmits the initiation order of the RA procedure (first initiation order) to the UE 100. In this case, the contention-free-based RA procedure is assumed, and thus, the MeNB 200-M designates the RA preamble to the UE 100 from among the contention-free-based RA preambles retained by the MeNB 200-M.

In step S303, the UE 100 having received the first initiation order and the second initiation order adopts the first initiation order. In this case, description proceeds while it is assumed that the UE 100 ignores the second initiation order.

In step S304, the UE 100 transmits, over the RACH, the RA preamble to the MeNB 200-M.

In step S305, the MeNB 200-M has received the RA preamble estimates delay in uplink with the UE 100, in response to the RA preamble. Then, the MeNB 200-M transmits the RA response to the UE 100. The RA response includes an adjustment value of a transmission timing of an uplink (Timing Advance value) and information on an assigned radio resource (UL Grant), for example. It is noted that the contention-free-based RA procedure is completed in step S305; however, when a contention-based RA procedure is concerned, the RRC message is exchanged between the UE 100 and the MeNB 200-M after step S305 and then the RA procedure is completed.

It is noted that in a case where the UE 100 withholds the second initiation order in step S303, the UE 100 completes the RA procedure on the MeNB 200-M, and thereafter, initiates the RA procedure to the SeNB 200-S.

[Other Embodiments]

In the above-described embodiments, a case is provided as an example where dual connectivity communication is applied to downlink; however, dual connectivity communication may be applied to uplink.

Furthermore, in the embodiment described above, although an LTE system is described as an example of a mobile communication system, the present disclosure is not limited to the LTE system, and may be applied to a system other than the LTE system.

[Additional Statement]

(1) Introduction

It was concluded that only control plane option C1 is adopted. This means only the MeNB has an RRC connection with UE over the Uu interface. Due to this limitation, it is necessary to clarify the UE behaviour as it pertains to an initiation of the dual connectivity scheme (Dual connectivity). As part of the initiation of the dual connectivity scheme, the random access procedure should also be clarified due to the potential for parallel random access processes. These issues are further clarified in the Additional statement with suggestions for possible solutions.

(2) Discussion (2.1) Initiation of the Dual Connectivity Scheme (Dual Connectivity Initiation)

The initiation of dual connectivity scheme should also be considered based on Option C1. If the UE is initially camped on a small cell, the small cell eNB will likely need to handover the UE to the macro eNB prior to dual connectivity scheme since the UE can only have RRC connection with the MeNB. Part of the reason for allowing the macro eNB to serve as the MeNB is due to mobility robustness. To reduce the number of MeNB handovers, which will always involve path switches, it is beneficial to allow the macro eNB to serve as the MeNB. One way to avoid the need for handovers from the small cell eNB to the macro eNB prior to dual connectivity scheme is to ensure that the UE always camp on a cell that may be served as the eNB since only the MeNB will configure dual connectivity scheme. However, since the small cell eNB has to support legacy UEs, it must be able to support legacy UEs as a standalone cell. Therefore, it may be difficult or undesirable to prevent UEs from camping on small cells. It should be considered whether further enhancements are needed for the Cell Reselection procedure for dual connectivity scheme capable UEs to prevent excessive handovers or if other enhancements are needed in the Connected mode. Examples of possible enhancements are as follows.

Enhancement for the Idle Mode UE

Rel-12 UE should be prevented from camping on small cell eNB. It may be possible to indicate in a SIB its cell type, i.e. capability to serve as MeNB. The drawback of such an enhancement is that Rel-12 UE will not use small cell eNB as its serving cell even if dual connectivity scheme is not needed.

Enhancement for Connected Mode UE

Another possibility is to allow the small cell eNB to handover the UE to the macro eNB as soon as the UE transitions to the connected mode. The disadvantage with this approach is that the small cell eNB cannot be used as a standalone cell for the Rel-12 UE in case dual connectivity scheme is not needed.

Proposal 1: It should considered whether enhancements are needed for Cell Reselection procedure for dual connectivity scheme capable UEs or if other enhancements are needed in the Connected mode to prevent excessive handovers.

(2.2) RACH

In general, the random access procedure is performed for the following events related to the PCell.

Initial access from RRC_IDLE

RRC Connection Re-establishment procedure

Handover

DL data arrival during RRC_CONNECTED requiring random access procedure

E.g. when UL synchronisation status is "non-synchronised"

UL data arrival during RRC_CONNECTED requiring random access procedure

E.g. when UL synchronisation status is "non-synchronised" or there are no PUCCH resources for SR available.

For positioning purpose during RRC_CONNECTED requiring random access procedure

E.g. when timing advance is needed for UE positioning

For initiation of dual connectivity scheme, it is reasonable to reuse existing procedure as much as possible. Contention free random access procedure is possible. For example, PDCCH order in PCell in MeNB can indicate random access procedure for special cell. An agreement as part of the SeNB change procedure was reached.

"If the SeNB chooses a synchronized reconfiguration, the UE performs a Random Access towards the SeNB. It does not matter in which order the UE sends RRCConnectionReconfigurationComplete and performs RA. The success of the RA is not required for a successful completion of the RRC procedure."

This implies agreement 3*a* from the SeNB change procedure may be reused for dual connectivity scheme initiation. Since this is an initiation procedure, there is no need to include the SeNB release part of the SeNB change procedure.

Proposal 2: The procedure for SeNB change is also applicable for dual connectivity scheme initiation.

Once dual connectivity scheme is initiated, special cell in SeNB is similar to PCell in MeNB, it is straight forward for the special cell to also initiate random access procedure e.g. positioning purpose. Otherwise, SeNB will need to request the MeNB PCell to initiate random access procedure over the Xn interface.

However, if the special cell can initiate random access procedure, the UE may initiate parallel random access procedures for MCG and SCG.

Currently for intra-eNB CA, RAR (Random Access Response) is only sent from the PCell. However, this is based on the ideal backhaul which isn't the case for dual connectivity scheme. In dual connectivity scheme, there is a possibility that the UE is allowed to initiate RA procedure to both MeNB and SeNB. However, if the UE can only receive RAR from the MeNB, depending on the latency of the Xn interface, this may adversely affect how the network can adequately determine the proper value for the T300 timer. Therefore, it would be better to allow the SeNB to send the RAR to the UE.

Proposal 3: When the UE sends RACH preamble to the SeNB, the SeNB should send the RAR to the UE.

(3) Conclusion

In this contribution, dual connectivity scheme initiation is discussed. Concern for the possible increase in the number of handovers is clarified. Resolutions include the possibility of cell reselection and/or handover enhancements. Issues with parallel random access procedure were also discussed as part of the dual connectivity scheme initiation.

INDUSTRIAL APPLICABILITY

As described above, according to the user terminal, the communication control method, and the base station according to the present disclosure, they are useful in a mobile communication field because it is possible to appropriately control the random access procedure in the dual connectivity scheme.

The invention claimed is:

1. A communication control method for controlling communication of a dual connectivity scheme in which a master base station and a secondary base station are used, the master base station establishing an RRC connection with a user equipment, and the secondary base station providing additional radio resources to the user equipment, the communication control method comprising:
    receiving predetermined information from the master base station, by the secondary base station;
    determining based on the predetermined information, by the secondary base station, whether or not a random access procedure is required between the user equipment and the secondary base station; and
    transmitting to the user equipment, by the secondary base station based on a result of the determination, a signal or triggering the user equipment to initiate the random access procedure.

2. A secondary base station configured to providing additional radio resources to a user equipment in a dual connectivity scheme, the secondary base station comprising:
    a receiver configured to receive predetermined information from a master base station having an RRC connection with the user equipment in the dual connectivity scheme;
    a controller configured to determine, based on the predetermined information, whether or not a random access procedure is required between the user equipment and the secondary base station; and
    a transmitter configured to transmit to the user equipment a signal for triggering the user equipment to initiate the random access procedure based on a result of the determination.

* * * * *